(12) United States Patent
Harada et al.

(10) Patent No.: US 11,122,168 B2
(45) Date of Patent: Sep. 14, 2021

(54) DOCUMENT CHECKING APPARATUS

(71) Applicant: KYOCERA Document Solutions Inc., Osaka (JP)

(72) Inventors: Hiroyuki Harada, Osaka (JP); Shinji Hayashi, Osaka (JP); Atsushi Fujiki, Osaka (JP); Nozomu Inami, Osaka (JP); Shuichi Masui, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/030,734

(22) Filed: Sep. 24, 2020

(65) Prior Publication Data

US 2021/0099583 A1 Apr. 1, 2021

(30) Foreign Application Priority Data

Sep. 26, 2019 (JP) .............................. JP2019-176259

(51) Int. Cl.
*H04N 1/00* (2006.01)
(52) U.S. Cl.
CPC ..... *H04N 1/00037* (2013.01); *H04N 1/00018* (2013.01); *H04N 1/00331* (2013.01);
(Continued)
(58) Field of Classification Search
CPC .......... H04N 1/00037; H04N 1/00697; H04N 1/00018; H04N 1/00748; H04N 1/00689; H04N 1/00331; H04N 2201/0094; H04N 1/00572; H04N 1/00578; H04N 1/0058; H04N 1/00602; H04N 1/00612; H04N 1/00745; H04N 1/00957; H04N 1/00204; H04N 1/00278; H04N 1/00307; H04N 1/0048; H04N 1/0049; H04N 1/00588; H04N 1/00591; H04N 1/00615; H04N 1/0062; H04N 1/00631; H04N 1/00681; H04N 1/00702; H04N 1/00705; H04N 1/00718; H04N 1/00734; H04N 1/00737; H04N 1/00755; H04N 1/00774; H04N 1/00793; H04N 1/00915; B65H 2220/01; B65H 2220/02; B65H 2220/03;
(Continued)

(56) References Cited

U.S. PATENT DOCUMENTS 5,452,374 A * 9/1995 Cullen ............... G06K 9/00463
382/293
5,845,057 A * 12/1998 Takeda ................... G06K 15/00
358/1.15
(Continued)

FOREIGN PATENT DOCUMENTS

JP 2001-283151 10/2001

*Primary Examiner* — Negussie Worku

(57) ABSTRACT

A document checking apparatus includes an image scanning device, a printing device, an output tray, and a controller. The image scanning device is configured to scan a document image sheet by sheet from a document including plural sheets. The output tray is as an output destination of both the document outputted from the image scanning device and a print sheet outputted from the printing device. The controller is configured to perform checking of the document image, and if an error is detected in the checking of the document image, control the printing device and thereby insert the print sheet as an interleaving sheet immediately before or immediately after a sheet where the error is detected.

4 Claims, 5 Drawing Sheets

(52) U.S. Cl.
CPC ..... *H04N 1/00689* (2013.01); *H04N 1/00697* (2013.01); *H04N 1/00748* (2013.01); *H04N 2201/0094* (2013.01)

(58) Field of Classification Search
CPC ............ B65H 2511/11; B65H 2511/12; B65H 2511/22; B65H 2515/112; B65H 2511/242; B65H 2511/512; B65H 2220/04; B65H 2511/20; B65H 2513/11; B65H 2513/42; B65H 2513/51; B65H 2801/06; B65H 29/60; B65H 1/04; B65H 1/266; B65H 2301/33312; B65H 2402/31; B65H 2402/32; B65H 2404/632; B65H 2405/324; B65H 2405/332; B65H 2407/21; B65H 2511/51; B65H 2553/612; B65H 2601/11; B65H 2801/27; B65H 29/125; B65H 31/24; B65H 43/00; B65H 7/04; B65H 7/06; B65H 85/00; B65H 2511/413; B65H 2801/39; B65H 29/12; B65H 43/04; B65H 5/062; B65H 5/26

USPC .................................................. 358/498, 474
See application file for complete search history.

(56) References Cited

U.S. PATENT DOCUMENTS

| | | | | |
|---|---|---|---|---|
| 7,017,903 | B2* | 3/2006 | Fujii | B65H 29/62 |
| | | | | 270/58.09 |
| 10,146,486 | B2* | 12/2018 | Condon | G06F 3/1208 |
| 10,384,823 | B2* | 8/2019 | Fujimoto | G06K 15/408 |
| 2006/0018695 | A1* | 1/2006 | Hirai | G03G 15/6538 |
| | | | | 399/407 |
| 2016/0255231 | A1* | 9/2016 | Sakata | H04N 1/00933 |
| | | | | 358/1.12 |
| 2016/0318731 | A1* | 11/2016 | Kowase | B65H 29/12 |
| 2017/0176911 | A1* | 6/2017 | Iguchi | B65H 7/02 |
| 2019/0104185 | A1* | 4/2019 | Sillitoe | H04L 67/16 |
| 2019/0119058 | A1* | 4/2019 | Chiba | B65H 7/02 |
| 2020/0270083 | A1* | 8/2020 | Fukuda | B65H 7/02 |

* cited by examiner

DOCUMENT CHECKING APPARATUS

CROSS-REFERENCE TO RELATED APPLICATIONS

This application relates to and claims priority rights from Japanese Patent Application No. 2019-176259, filed on Sep. 26, 2019, the entire disclosures of which are hereby incorporated by reference herein.

BACKGROUND

1. Field of the Present Disclosure

The present disclosure relates to a document checking apparatus.

2. Description of the Related Art

In a checking system, an OCR device scans a predetermined OCR area in a formatted document and performs character recognition for the scanned image, and a control device determines validity of a result of the character recognition and prints an error list based on the validation result using a printing device.

However, in the aforementioned system, if a document to be processed has a lot of sheets, some burden is required to find a sheet where an error occurs in a bunch of the sheets on the basis of the error list.

SUMMARY

A document checking apparatus according to an aspect of the present disclosure includes an image scanning device, a printing device, an output tray, and a controller. The image scanning device is configured to scan a document image sheet by sheet from a document including plural sheets. The output tray is as an output destination of both the document outputted from the image scanning device and a print sheet outputted from the printing device. The controller is configured to perform checking of the document image, and if an error is detected in the checking of the document image, control the printing device and thereby insert the print sheet as an interleaving sheet immediately before or immediately after a sheet where the error is detected.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
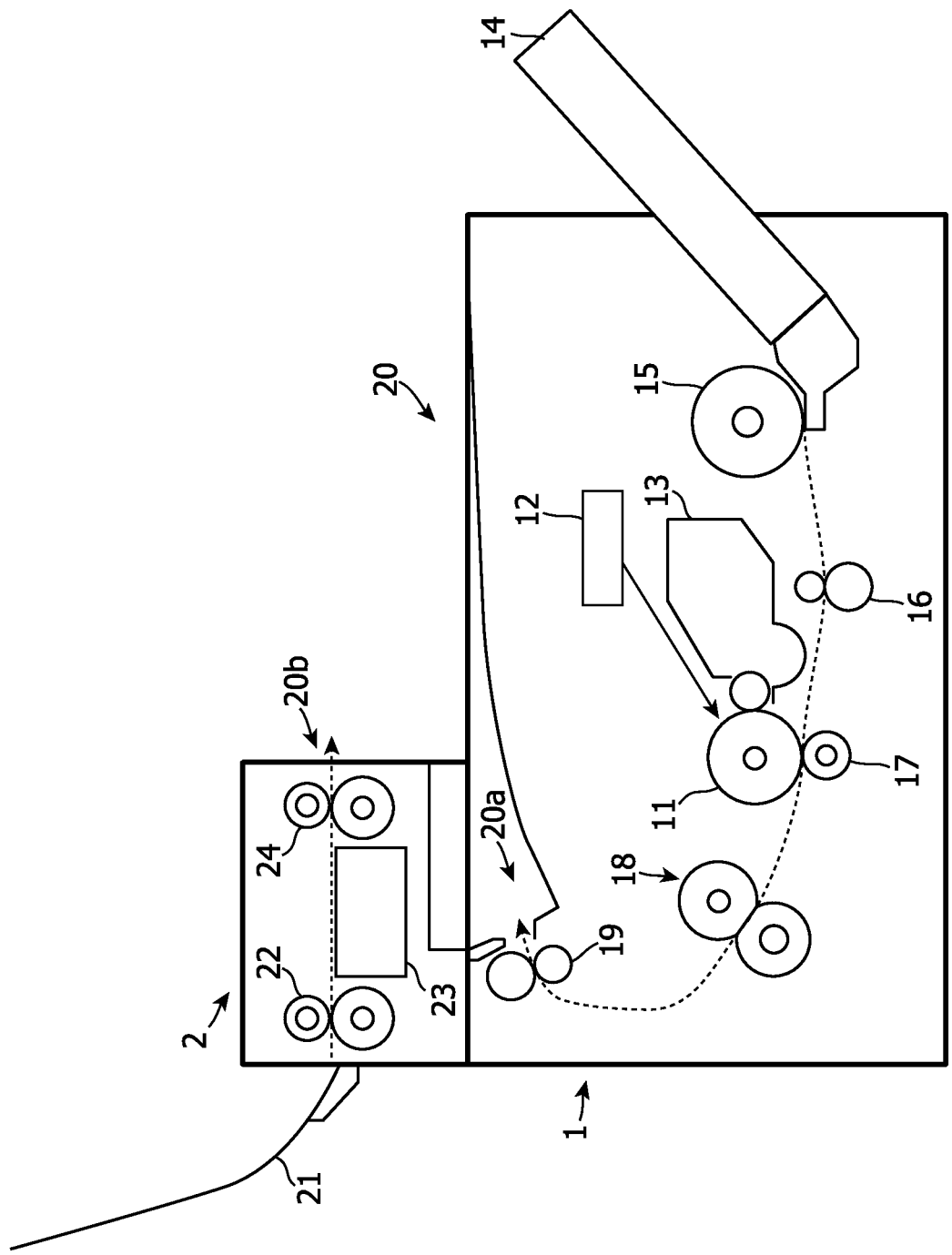
FIG. 1 shows a side view that indicates an internal configuration of a document checking apparatus in an embodiment according to the present disclosure.

FIG. 1 shows a side view that indicates an internal configuration of a document checking apparatus in an embodiment according to the present disclosure. The document checking apparatus shown in FIG. 1 includes a printing device 1 and an image scanning device 2 that are connected to each other.

The printing device 1 transports a print sheet, prints an image on the print sheet in an electrographic manner, and outputs the print sheet after the printing.

The printing device 1 includes a photoconductor drum 11, an exposure device 12, a development device 13, a sheet feeding cassette 14, a feeding roller 15, a transportation roller 16, a transfer roller 17, a fuser 18, and a transportation roller 19.

The exposure device 12 is a device that scans and irradiates the photoconductor drum 1 with laser light and thereby forms an electrostatic latent image. The photoconductor drum 11 is scanned with the laser light in a direction (a primary scanning direction) perpendicular to a rotation direction (a secondary scanning direction) of the photoconductor drum 11. The exposure device 12 includes a laser scanning unit that includes a laser diode as a light source of the laser light, optical elements (such as lens, mirror and polygon mirror) that guide the laser light to the photoconductor drum 11.

Further, a charging unit, a cleaning device, a static electricity eliminator and the like are disposed in the periphery of the photoconductor drum 11. The cleaning device removes residual toner on the photoconductor drum 11 after transferring a toner image. The static electricity eliminator eliminates static electricity of the photoconductor drum 11 after transferring a toner image.

The development device 13 adheres toner on the electrostatic latent image on photoconductor drum 11, and thereby forms a toner image. The toner is supplied from a toner hopper in a toner cartridge that contains toner.

The sheet feeding cassette 14 stores a print sheet, and for example, pushes up the print sheet using a lift plate (not shown) so as to cause the print sheet to contact with the feeding roller 15. The feeding roller 15 feeds the print sheet sheet by sheet onto a transportation path.

The transfer roller 17 causes the print sheet in transportation by the rollers 15 and 16 to contact with the photoconductor drum 11, and transfers the toner image to the print sheet. The print sheet on which the toner image has been transferred is transported to the fuser 18, and consequently, the toner image is fixed on the print sheet. Further, the print sheet on which the toner image has been fixed is outputted through an outlet 20a to an output tray 20 by the transportation roller 19.

The output tray 20 is a common tray that is commonly used as an output destination of the print sheet outputted from the printing device 1 and an output destination of the document outputted from the image scanning device 2. In this embodiment, the image scanning device 2 is arranged on a top surface of a housing of the print sheet 1, and the output tray 20 is formed on this top surface.

The image scanning device 2 optically scans a document image sheet by sheet from a document including plural sheets. The image scanning device 2 includes a document tray 21, a transportation roller 22, an image scanning unit 23, and a transportation roller 24.

The transportation roller 22 transports the document put on the document tray 21 sheet by sheet. The image scanning unit 23 irradiates the document transported by the transportation roller 22 with light and detects reflection light from the document using an optical sensor, and thereby generates image data of a document image of the document. The transportation roller 24 is arranged in a downstream side of the image scanning unit 23, and outputs the document after the image scanning through the outlet 20b to the output tray 20. The outlet 20b of the document is arranged at a higher position than an outlet 20a of the print sheet.

Figure 2:
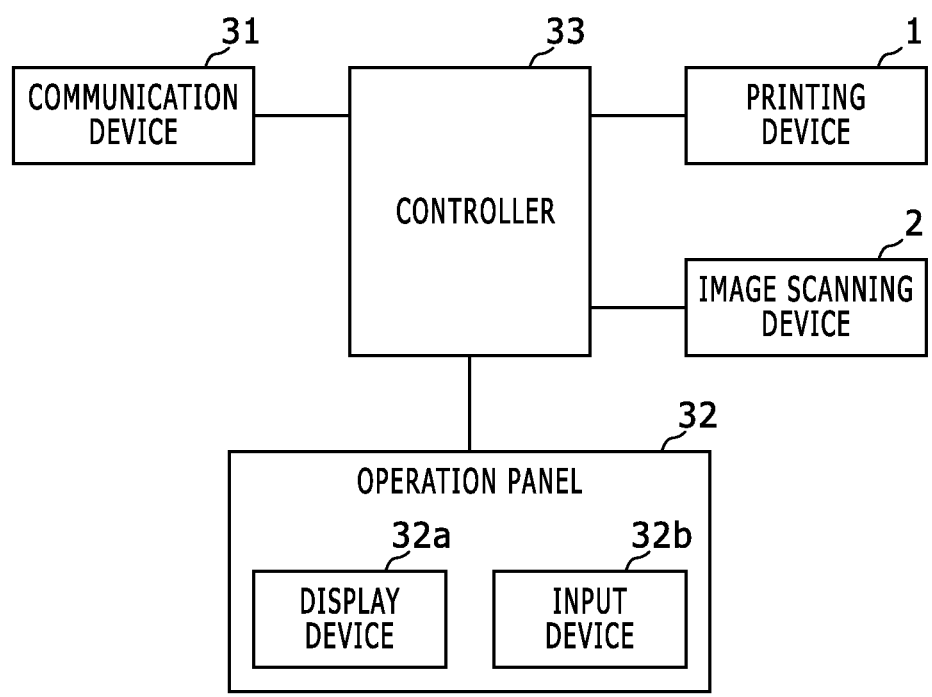
FIG. 2 shows a block diagram that indicates a configuration of the document checking apparatus shown in FIG. 1.

FIG. 2 shows a block diagram that indicates a configuration of the document checking apparatus shown in FIG. 1.

As shown in FIG. 2, the present document checking apparatus further includes a communication device 31, an operation panel 32, and a controller 33.

The communication device 31 is a device that performs data communication with an external device. The communication device 31 is a peripheral device interface, a network interface, or the like. The operation panel 32 is arranged on a surface of a housing of the present document checking apparatus, and includes a display device 32a that displays sorts of information to a user and an input device 32b that detects a user operation. For example, the display device 32a includes a liquid crystal display and/or the like, and the input device 32b includes a touch panel, a hard key and/or the like.

The controller 33 includes a processor such as a computer and/or an ASIC (Application Specific Integrated Circuit), and performs a software process and/or a hardware process using the processor and thereby controls the printing device 1, the image scanning device 2 and the like for document checking.

Specifically, the controller 33 obtains image data of the document image from the image scanning device 2, and performs checking of the document image; and if the controller 33 detects an error in the checking of the document image, the controller 33 controls the printing device 1 and thereby inserts a print sheet as an interleaving sheet immediately before or immediately after a sheet where the error is detected.

For example, in the checking, the controller 33 performs a character recognition process for a predetermined area in the document image, and determines whether a character is detected in the predetermined area or not; and if no characters or no seals are detected in the predetermined area, the controller 33 determines that this document image includes an error. For example, if the aforementioned predetermined area is set as a signature section or a seal section in the document, and no characters or no seals are detected, then it is determined that the signature section or the seal section does not include a signature or a seal and therefore it is determined that this document image includes an error.

Figure 3:
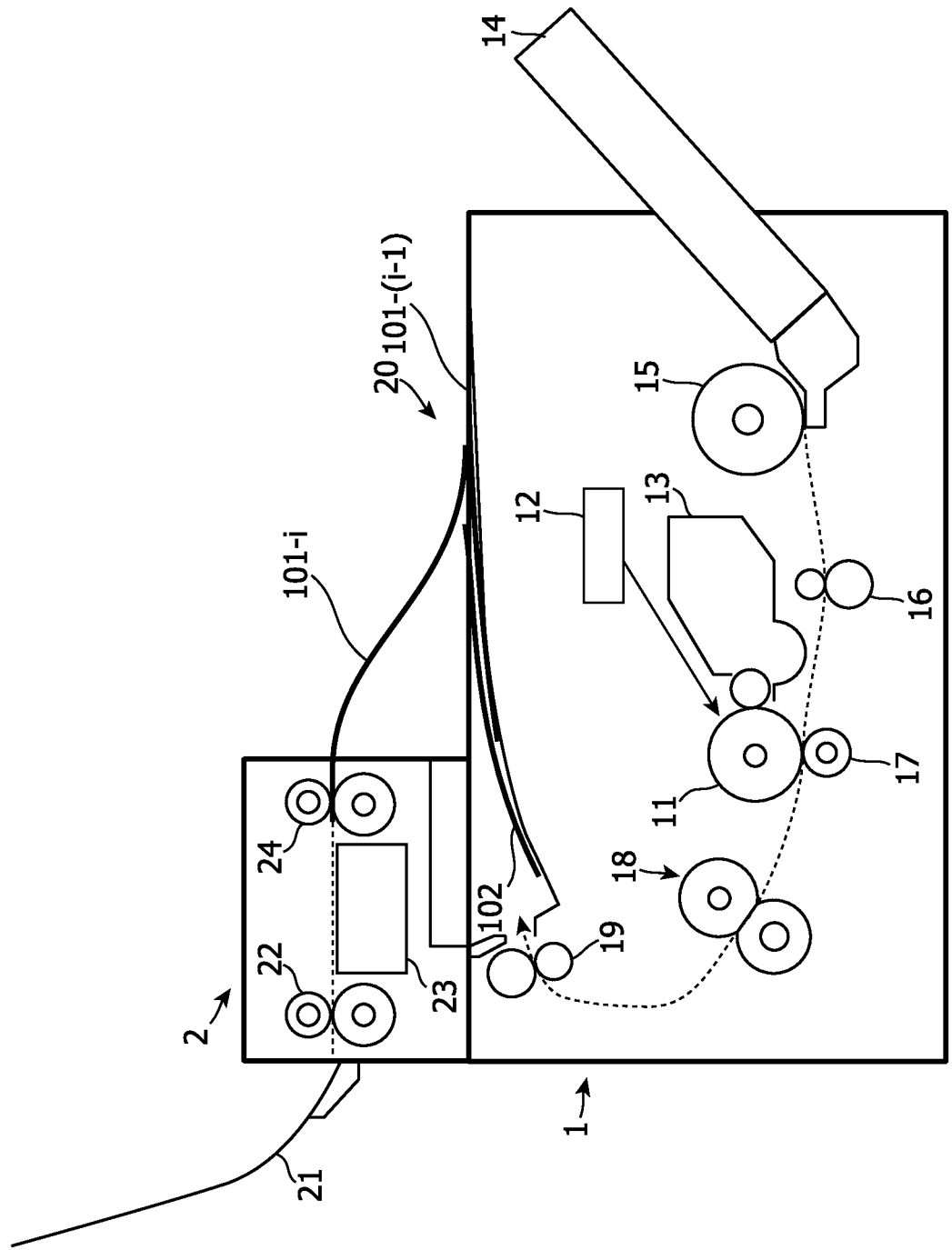
FIG. 3 shows a diagram that explains a document and a print sheet outputted from the document checking apparatus shown in FIGS. 1 and 2 (1/2)
Figure 4:
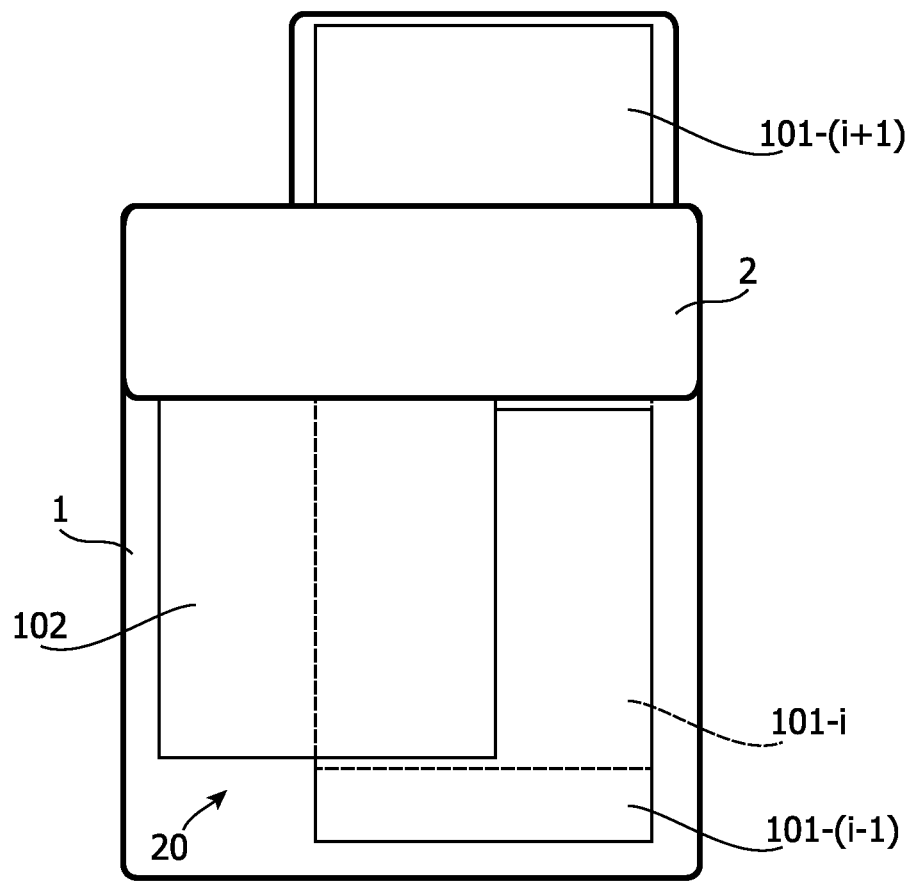
FIG. 4 shows a diagram that explains a document and a print sheet outputted from the document checking apparatus shown in FIGS. 1 and 2 (2/2)

FIG. 3 shows a diagram that explains a document and a print sheet outputted from the document checking apparatus shown in FIGS. 1 and 2 (1/2). FIG. 4 shows a diagram that explains a document and a print sheet outputted from the document checking apparatus shown in FIGS. 1 and 2 (2/2).

Further, in this embodiment, as shown in FIG. 3, for example, the controller 33 (a) stops transportation of the sheet 101-i where the error is detected with nipping a rear end part of the sheet 101-i where the error is detected (or stops transportation of a next sheet to the sheet 101-i where the error is detected with nipping a rear end part of the next sheet) using the transportation roller 24 of the image scanning device, (b) causes the printing device 1 to output the print sheet 102 as the interleaving sheet, and (c) causes the image scanning device 2 to resume the transportation of the sheet 101-i (or the next sheet) and output the sheet 101-i (or the next sheet) after outputting the print sheet 102 as the interleaving sheet. The print sheet 102 as the interleaving sheet may be transported at a start time of the checking in advance to a predetermined position (a position immediately before the transferring position, a position immediately before the outlet 20a or the like) on the transportation path.

Furthermore, in this embodiment, as shown in FIG. 4, for example, the document 101-i and the print sheet 102 are outputted such that edges of the document 101-i and the print sheet 102 (i.e. edges substantially parallel to the output direction) are arranged at positions different from each other in a width direction of the output tray 20 (in a direction perpendicular to an output direction of the document 101-i and the print sheet 102). In other words, the outlets 20a and 20b are formed such that the document 101-i and the print sheet 102 are outputted in the aforementioned manner.

In this embodiment, sizes of the document 101-i and the print sheet 102 are same as each other, and the document 101-i and the print sheet 102 are outputted such that centers of the document 101-i and the print sheet 102 are arranged at different positions from each other. The print sheet 102 as the interleaving sheet may have a larger size than the document 101-i.

Further, when detecting an error in the checking of the document image, the controller 33 causes the printing device 1 to print explanation (e.g. an occurrence position of the error, details of the error and/or the like) of the error on the print sheet 102 as the interleaving sheet.

Figure 5:
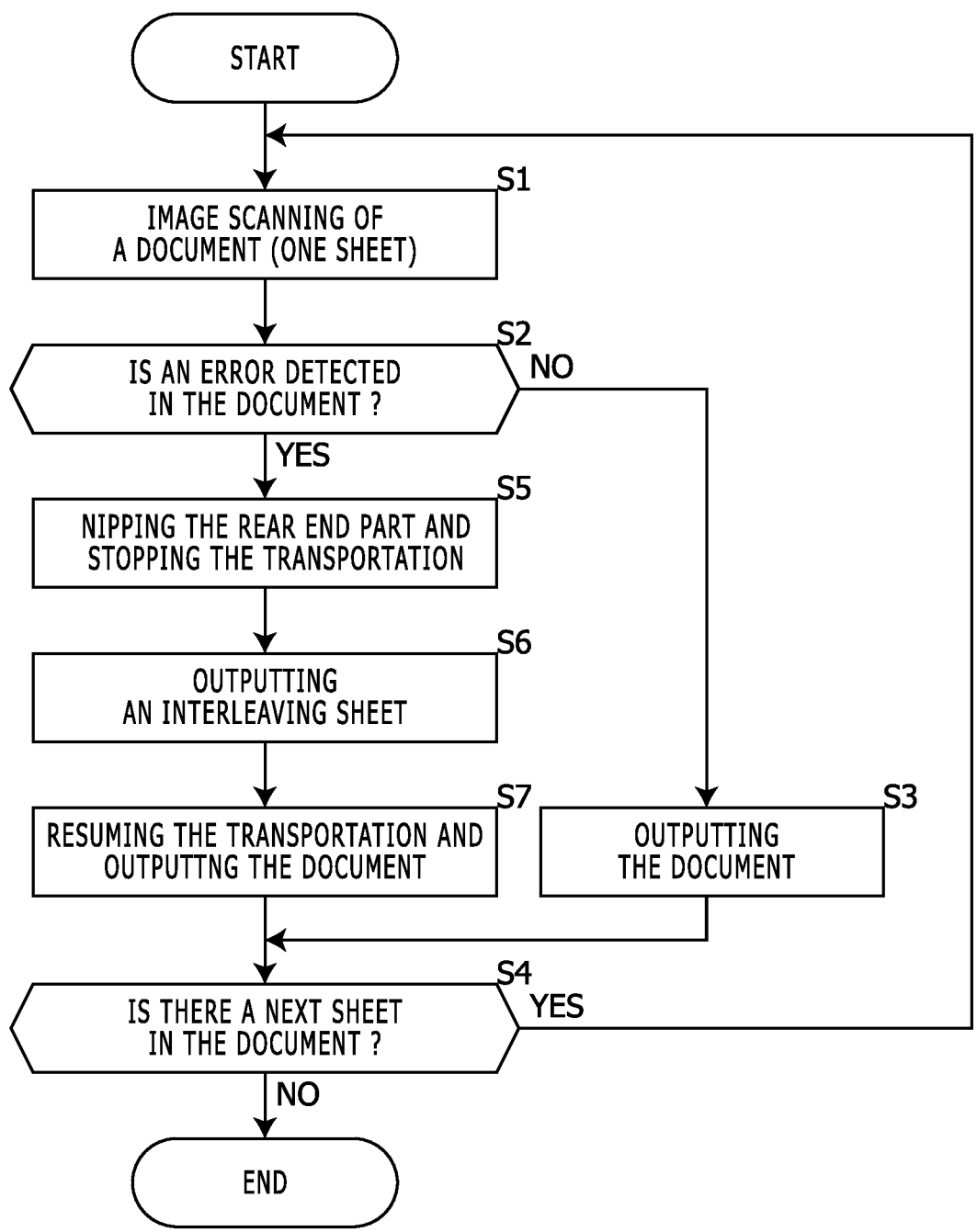
FIG. 5 shows a flowchart that explains a behavior of the document checking apparatus shown in FIGS. 1 and 2.

The following part explains a behavior of the aforementioned document checking apparatus. FIG. 5 shows a flowchart that explains a behavior of the document checking apparatus shown in FIGS. 1 and 2.

A user puts plural sheets 101-1 to 101-N (N>1) of a document on the document tray 21, and performs a predetermined user operation to the input device 32b of the operation panel 32 and thereby causes the present document checking apparatus to perform checking of the document put by the user.

When detecting this user operation using the input device 32b, the controller 33 performs the checking of the document as follows.

The controller 33 causes the image scanning device 2 to sequentially sheet by sheet perform transportation of a sheet 101-i of the document and image scanning of a document image of the sheet 101-i, and thereby obtains image data of the document image (in Step S1); and tries to detect an error in the document image and determines whether an error is detected in this sheet 101-i or not (in Step S2). If no errors are detected, then controller 33 does not stop the transportation of the sheet 101-i, and outputs the sheet 101-i from the image scanning device 2 to the output tray 20 (in Step S3).

Contrarily, if an error is detected on the sheet 101-i, then the controller 33, as shown in FIG. 3, for example, temporarily stops the transportation of the sheet 101-i while causing the image scanning device 2 to nip a rear end part of the sheet 101-i using the transportation roller 24 (in Step S5). Under this status, the controller 33 causes the printing device 1 to output a print sheet 102 as an interleaving sheet (in Step S6). In this embodiment, if transportation of the sheets 101-1 to 101-N of the document is not stopped, the sheets 101-1 to 101-N are continuously transported from the document tray 21. Specifically, with a predetermined interval, the transportation of the sheet 101-i is started before a previous sheet 101-(i−1) is outputted.

Consequently, even if a front end part of the sheet 101-i contacts with an upper surface of the previous sheet 101-

(*i*−1), a rear end part of the sheet 101-*i* does not contact with the upper surface of the previous sheet 101-(*i*−1), and therefore the interleaving sheet is inserted between the previous sheet 101-(*i*−1) and the sheet 101-*i* on the output tray 20.

After outputting the print sheet 102 as the interleaving sheet, the controller 33 causes the image scanning device 2 to resume the transportation of the sheet 101-*i* and output the sheet 101-*i* to the output tray 20 (in Step S7). Here, the sheet 101-*i* where an error has been detected is outputted onto the interleaving sheet.

The controller 33 may cause the image scanning device 2 to output without stopping the transportation the sheet 101-*i* where an error has been detected, stop transportation of the next sheet 101-(*i*+1), and resume the transportation of the next sheet 101-(*i*+1) and output the next sheet 101-(*i*+1) to the output tray 20 after outputting the print sheet 102 as the interleaving sheet. In such a case, the interleaving sheet is outputted onto the sheet 101-*i* where an error has been detected.

Subsequently, if there is the next sheet 101-(*i*+1) (in Step S4), the image scanning and the like are performed as well for the next sheet 101-(*i*+1), and if there is not the next sheet 101-(*i*+1), the controller 33 terminates the checking of the document.

As mentioned in the aforementioned embodiment, onto the output tray 20, a document is outputted from the image scanning device 2 and a print sheet is outputted from the printing device 1. The controller 33 performs checking of the document image scanned sheet by sheet by the image scanning device 2; and if the controller 33 detects an error in the checking of the document image, the controller 33 controls the printing device 1 and thereby inserts a print sheet as an interleaving sheet immediately before or immediately after a sheet where the error is detected.

Consequently, using the interleaving sheet, a user easily determines a sheet where an error occurs in a document including plural sheets.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiment, the controller 33 may display on the display device 32*a* a list of an error that occurs on a series of the sheets 101-1 to 101-N of the document, may print the list using the printing device 1, and/or may transmit the list to a predetermined host device using the communication device 31.

What is claimed is:

1. A document checking apparatus, comprising:
   an image scanning device configured to scan a document image sheet by sheet from a document including plural sheets;
   a printing device;
   an output tray as an output destination of both the document outputted from the image scanning device and a print sheet outputted from the printing device; and
   a controller configured to perform checking of the document image, and if an error is detected in the checking of the document image, control the printing device and thereby insert the print sheet as an interleaving sheet immediately before or immediately after a sheet where the error is detected; and the controller causes the printing device to print an explanation of the error on the print sheet as the interleaving sheet.

2. The document checking apparatus according to claim 1 wherein
   the printing device comprises an outlet of the print sheet;
   the image scanning device comprises an image scanning unit, a transportation roller in a downstream side of the image scanning unit, and an outlet of the document;
   the outlet of the document is arranged at a higher position than the outlet of the print sheet; and
   the controller (a) stops transportation of the sheet where the error is detected with nipping a rear end part of the sheet where the error is detected or stops transportation of a next sheet to the sheet where the error is detected with nipping a rear end part of the next sheet using the transportation roller of the image scanning device, (b) causes the printing device to output the print sheet as the interleaving sheet, and (c) causes the image scanning device to resume the transportation of the sheet or the next sheet and output the sheet or the next sheet after outputting the print sheet as the interleaving sheet.

3. The document checking apparatus according to claim 1 wherein the document and the print sheet are outputted such that edges of the document and the print sheet in a width direction of the output tray are arranged at positions different from each other.

4. The document checking apparatus according to claim 1 further comprising a display device and a communication device; wherein the controller is configured to display on the display device a list of detected errors and is further configured to transmit the list to a predetermined host device using the communication device.

* * * * *